United States Patent Office 3,615,100
Patented Oct. 26, 1971

3,615,100
CHUCKS
John Banner, Stourport, England, assignor to Edward Williams, Birmingham, England
Filed Apr. 23, 1969, Ser. No. 818,741
Claims priority, application Great Britain, May 21, 1968, 24,151/68
Int. Cl. B23b 31/30
U.S. Cl. 279—4
3 Claims

ABSTRACT OF THE DISCLOSURE

The invention relates to a fluid operable chuck comprising in combination a central part adapted for connection to a spindle whereby the chuck can be rotated, said part being shaped internally (as at 10a) to co-act with the complementary surface of a collet whereby movement of the collet towards the spindle will cause the collet to be closed, a tubular member slidable on the part, and a seating portion on the member for engagement with the collet, resilient means acting between a shoulder on the member and an abutment on the part to urge the seating portion inwardly relative to the part, a plurality of annularly arranged anti-friction balls disposed between a pair of complementarily inclined surfaces on the part and member respectively, a relatively fixed cylinder surrounding the part and member, and a fluid operable annular piston in the cylinder, the piston having a conical internal surface for co-action with the balls whereby movement of the piston in one direction will move the balls radially inwards between said surfaces to move the member relative to the part against the action of the resilient means to release the seating from the collet.

---

This invention relates to fluid operable chucks more particularly for use with lathes or other machine tools.

The object of the invention is to provide such a chuck in a convenient form whereby relatively large adjustments of the collet can be effected, and whereby the bearings through which the fluid pressure acts to release the chuck are substantially unstressed during rotation of the chuck, and furthermore whereby the fluid can be applied without the use of rotating seals or couplings.

A chuck according to the invention comprises in combination a tubular central part adapted for connection to a spindle whereby the chuck can be rotated, said part being shaped internally to receive a collet and having a tapering surface complementary to a surface of the collet whereby movement of the collet inwardly towards the spindle will close the collet, a tubular member slidable upon said part, a seating portion on the member for engagement with a collet in said part, resilient means acting between a shoulder on the member and an abutment on said part to urge the seating portion inwardly relative to said part, a plurality of annularly arranged anti-friction balls disposed between a pair of complementarily inclined surfaces on the part and member respectively, a relatively fixed cylinder surrounding the member and part, and a fluid operable annular piston in the cylinder, said piston having a conical internal surface for co-action with the balls whereby movement of the piston in one direction will move the balls radially inwards between said complementary inclined surfaces to move the member relative to said part against the action of the resilient means to release the seating from the collet.

Figure 1:
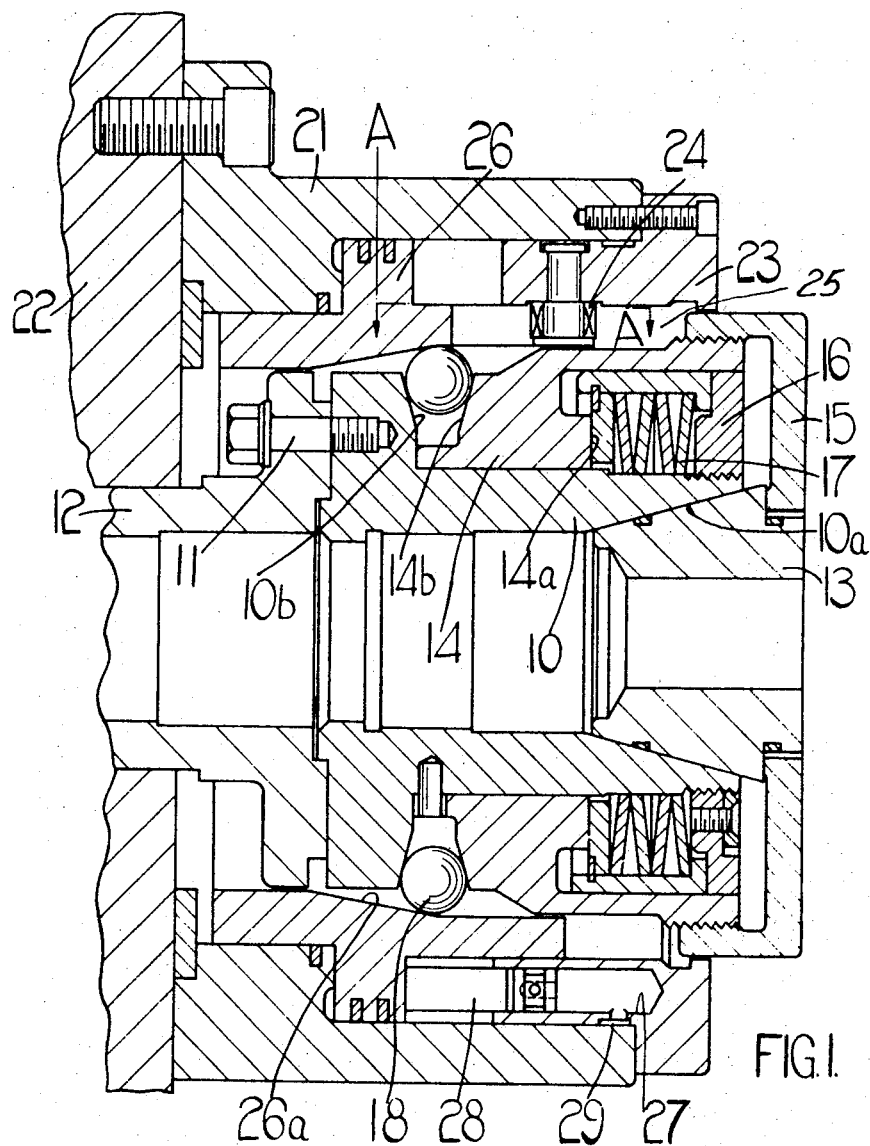
Figure 2:
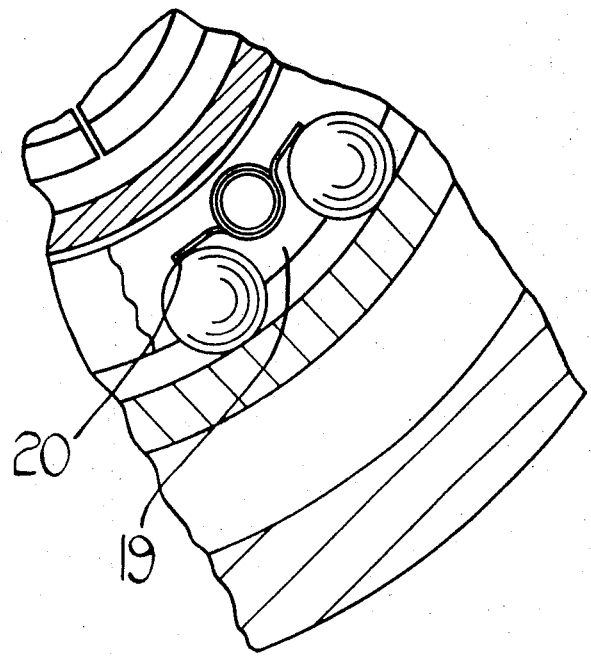
Figure 3:
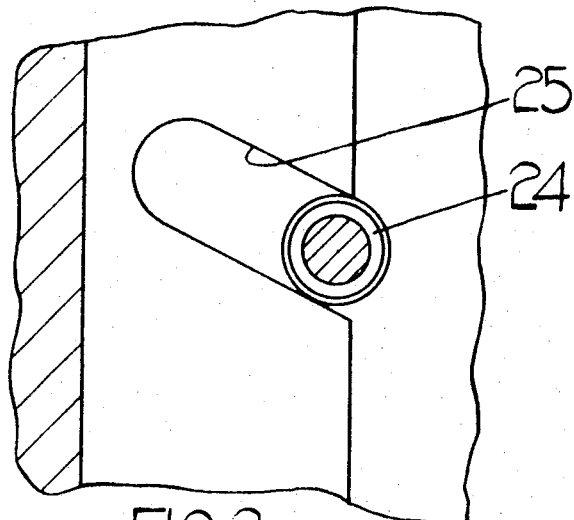

In the accompanying drawings FIG. 1 is a sectional side view and FIG. 2 is a part sectional end view of an example of the invention, whilst FIG. 3 is a section on the line A—A of FIG. 1.

Referring to the drawings there is provided, a tubular central part 10 provided at one end with a flange having tapped holes for the reception of screws 11 whereby the part 10 can be co-axially connected to the spindle 12 of a lathe. The internal periphery of the part 10 at its end remote from the flange is shaped to conical form as shown at 10a to co-act with a complementary surface on a collet 13 in such a manner that as the collet is moved inwardly (i.e. to the left as viewed in FIG. 1) the collet will be closed.

Slidably mounted on a cylindrical portion of the periphery of the part 10 is an annular member 14 having a screw-threaded skirt with which is engaged a cap 15 extending over the outer end of the bore in the part 10 to form a seating arranged to bear against the collet 13. Acting between a shoulder 14a on the member 14, and an abutment collar 16 in screw-thread engagement with the outer end of the part 10 is a plurality of conical spring washers 17 which tend to urge the member 14 and cap 15 inwardly in a direction to close the collet 13.

Between an inclined annular shoulder 14b on the member 14, and a complementarily inclined surface 10b on the flange of the part 10, is a race of annularly arranged anti-friction balls 18 which are retained in angularly spaced relationship within a cage 19 (omitted in FIG. 1). The balls 18 are spring loaded in a radially outward direction by torsion springs 20 coiled about pins in the cage 19.

Surrounding the part 10 and member 14 is a cylinder 21 which is secured to the headstock 22 of the lathe so as to be stationary in relation to the parts already mentioned. To the cylinder 21 is secured an annular part 23 which carries at a pair of diametrically opposite positions, a pair of rollers 24 respectively (one only of which is shown in the drawings). The rollers 24 engage helical slots 25 in the skirt of an annular piston 26 engaging the cylinder 21. Also in the part 23 are formed a plurality of angularly spaced cylinders 27 (one only of which is shown in the drawings), with which are engaged respectively a plurality of pistons 28 arranged to bear against the piston 26. In the cylinder 21 are a pair of openings (not shown) which are arranged alternately to serve as the inlet and the outlet respectively for fluid (preferably pneumatic) pressure. The one opening communicates with the left hand end of the cylinder 21 as viewed in FIG. 1, whilst the other communicates with an annular groove 29 in communication with the plurality of cylinders 27. When fluid pressure is admitted to the left hand end of the cylinder 21 the piston 26 will be moved to the right as viewed in FIG. 1, and when fluid pressure is admitted to the cylinders 27 the pistons 28 will bear against the piston 26 and thereby move it to the left as viewed in FIG. 1. During this movement of the piston 26, it will partake of a small angular movement about its axis due to the interengagement of the slots 25 with the rollers 24.

On the internal surface of the piston 26 is a conical surface 26a arranged to co-act with the balls 18. The arrangement is such that as the piston 26 moves to the right as viewed in FIG. 1, the balls will be moved radially inwards thereby wedging the surfaces 10b and 14b apart against the action of the spring washers 17 to release the collet 13 and allow it to open. Conversely, as the piston 26 is moved to the left as viewed in FIG. 1, the spring washers 17 will return the member 14 to the position shown to close the collet 13. Meanwhile the balls 18 are moved radially outwards by the springs 20 which tend to hold the balls in a position in which they are removed from both surfaces 10b and 14b. As a result the part 10 and member 14 can rotate without imparting any load to the piston 26. Moreover, after the opening of the collet 13, since the balls 18 are wedging between the surfaces 10b and 14b no reaction is taken by the spindle 12 of the lathe.

Having thus described our invention what I claim as new and desire to secure by Letters Patent is:

1. A fluid pressure operable chuck comprising in combination, a tubular central part adapted for connection to a spindle whereby the chuck can be rotated, a collet located within said port, complementary tapering surfaces on the collet and part whereby movement of the collet inwardly towards the spindle will effect closure of the collet, a tubular member slidable upon said part, a seating portion on the member for engagement with a collet in said part, resilient means acting between a shoulder on the member and an abutment on said part to urge the seating portion inwardly relative to said part, a pair of complementarily inclined surfaces on the part and member respectively, a plurality of annularly arranged antifriction balls disposed between said pair of inclined surfaces, a cylinder surrounding the member and part, a fluid pressure operable annular piston in the cylinder, a conical internal surface on the piston for co-operation with said balls whereby movement of the piston in one direction will effect inward movement of the balls between said surfaces and thereby will move the part against the action of the resilient means to release the seating from the collet, and means for imparting angular movement to the annular piston as it is moved under the action of fluid pressure.

2. A fluid pressure operable chuck as claimed in claim 1 including a cage in which the balls are disposed and spring means loading said balls in a radially outward direction.

3. A fluid pressure operable chuck according to claim 1 in which said means comprises a radially inward extending pin mounted on the cylinder, a roller carried by the pin, and a helical groove formed in the piston and in which said roller is located.

References Cited

UNITED STATES PATENTS

| 2,153,971 | 10/1936 | Montgomery | 279—51 |
| 2,883,200 | 5/1955 | Smith | 279—51 X |
| 3,460,848 | 8/1969 | Brown | 279—51 X |

ANDREW R. JUHASZ, Primary Examiner

J. F. COAN, Assistant Examiner

U.S. Cl. X.R.

90—11 A; 279—51